Sept. 22, 1959   J. M. VANCE   2,905,045
BLIND FASTENER HAVING EXPANSION RING BENEATH-TAPERED PIN HEAD
Filed April 7, 1955
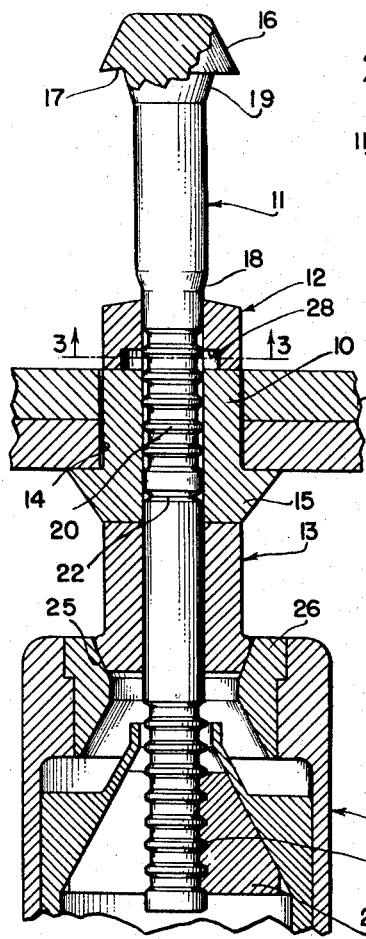
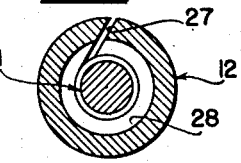
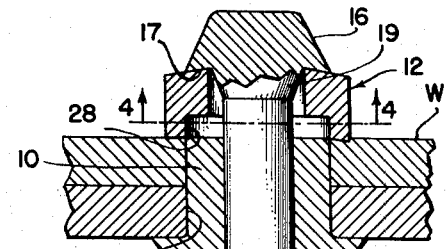
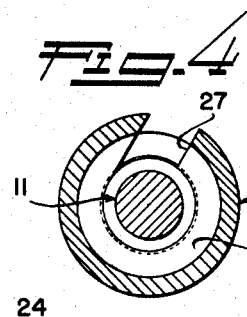
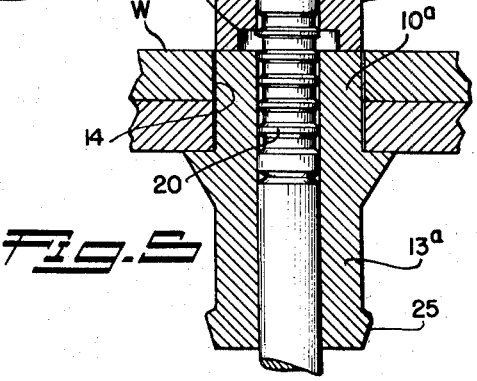
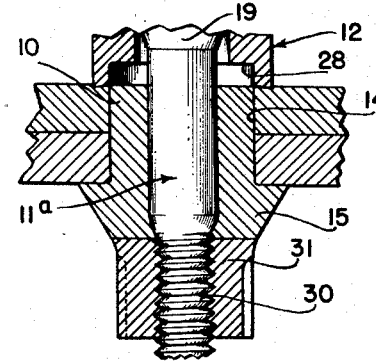
INVENTOR.
JAMES M. VANCE
BY
Agent

United States Patent Office 2,905,045
Patented Sept. 22, 1959

2,905,045
BLIND FASTENER HAVING EXPANSION RING BENEATH TAPERED PIN HEAD

James M. Vance, Smyrna, Ga., assignor to Lockheed Aircraft Corporation, Burbank, Calif.

Application April 7, 1955, Serial No. 499,856

2 Claims. (Cl. 85—40)

This invention relates to fasteners such as rivets and bolts and has more particular reference to such fasteners for use in situations where one side of the assembly of parts or sheets to be fastened together is inaccessible or difficult of access.

Blind fasteners of the general type above mentioned are used quite extensively in aircraft manufacture and other fields and several classes of such fasteners have been introduced. One of the presently most popular of such forms of such fasteners incorporates a collar constructed either integral with the tubular sleeve or as a separate part and formed of a comparatively soft workable material so as to be upset or deformed when the fastener is "driven," this upsetting or deforming being depended upon to secure the fastener in its operative position where it performs its function of fastening together the sheets or other parts. Due to the necessarily inherent soft workable character of the material used in these present-day and earlier fasteners the bolts or rivets have relatively low strength particularly in shear. Another form or general class of blind fastener that has been introduced necessitates the provision of screw threads on two or more of its components. These screw threads make the fasteners expensive to manufacture, the ultimate cost of the fasteners in some instances being prohibitive.

It is a general object of this invention to provide a simple, inexpensively manufactured blind fastener of high physical strength characteristics.

Another object of the invention is to provide a blind fastener of the character referred to in which the shear carrying elements have essentially no material limitations and may be constructed of high strength materials. The fasteners of the invention as installed do not require the upsetting or deforming of the sleeve, blind-side collar or other part and all shear carrying components of the fasteners may be constructed of heat treated steel or any other suitable high strength material to develop full shear strength, etc.

Another object of the invention is to provide blind fasteners having preformed or manufactured heads at both sides of the assembly or work to insure high strength connections. This is to be distinguished from many of the earlier fasteners wherein the head at one side is upset or otherwise formed at the time of installation requiring the use of soft or relatively soft materials thereby reducing the strength of the fastener.

A further object of the invention is to provide a blind fastener that fully and tightly fills or occupies the opening in the work parts or assembly, that may be designed or constructed to have any reasonable grip tolerance with respect to the accessible and blind sides of the work and wherein the pin is securely locked and retained in the sleeve and collar, these features eliminating looseness and insuring firm, tight, high strength attachment characteristics.

A still further object of the invention is to provide a blind fastener that may be easily and quickly installed by means of the standard or typical devices used to drive or operate conventional blind fasteners.

Other objectives and features of the invention will become apparent from the following detailed description of the typical forms and applications illustrated in the accompanying drawings in which:

Figure 1 is a longitudinal sectional view of one embodiment of the fastener of the invention with the major portion of the pin appearing in side elevation, the fastener being installed in the opening in the work and showing a portion of the installation tool associated therewith;

Figure 2 is a view similar to Figure 1 showing the fastener installed in its operative position and the installation tool removed therefrom;

Figures 3 and 4 are transverse detailed sectional views taken substantially as indicated by lines 3—3 and 4—4 respectively in Figures 1 and 2;

Figure 5 is a longitudinal sectional view of another embodiment of the fastener of the invention wherein the collar and sleeve are integral showing the fastener in position prior to final installation; and Figure 6 is a fragmentary view similar to Figure 2 illustrating a screw thread collar type of fastener of the invention.

In the embodiment shown in Figures 1 to 4 inclusive, the fastener of the invention may be said to comprise generally a hollow or tubular sleeve 10, a pin 11 extending through the sleeve, an expansible and preferably resilient ring 12 on the pin 11 at the blind or inaccessible side of the installation and a collar 13 on the pin at the accessible side.

The sleeve 10 is intended to be arranged to extend through the opening 14 in the work W, which in the installation illustrated comprises a pair of sheets of metal or the like. One end of the tubular sleeve 10 has a preformed or manufactured head 15 for engaging or bearing inwardly against the accessible side of the work. The other end of the sleeve 10 is adapted to lie substantially flush with the inner or inaccessible side of the work W when the head 15 is in position against the accessible side. Although I have shown the sleeve 10 provided with a protruding type head 15 it will be apparent to those skilled in the art that the sleeve may be provided with a flush type manufactured head for seating in a recess or countersink in the accessible side of the work W to lie flush with the surface thereof.

The pin 11 passes through the tubular sleeve 10 and prior to final installation is adapted to move or slide in the sleeve. As illustrated in Figure 1 the pin 11 is considerably longer than the sleeve 10 and is adapted to protrude from both sides of the work W when the fastener is first inserted in the opening 14. The inner end of the pin 11 that is, the end of the pin protruding from the blind side of the work, has a preformed or manufactured head 16 for cooperating with the ring 12 as will be later described. This head 16 has an annular concave or undercut under surface 17 opposing the blind side of the work W. The pin 11 is adapted to be moved longitudinally in the sleeve 10 to actuate the fastener and is constructed so that such movement expands and tightens the sleeve in the opening 14 of the work. The pin 11 has a neck or flared region 18 spaced from the head 16 and located adjacent the ring 12 when the pin is in the position shown in Figure 1 where it is ready for forward or outward actuation. This annular partially conical region 18 joins the two adjacent cylindrical or round parts of the pin 11 and may be proportioned in relation to the original clearance between the surface of the sleeve 10 at the wall of the opening 14 to insure tight fitting and binding of the sleeve in the opening 14 when the pin is pulled forwardly through the sleeve. As shown in Figure 2 the flared region 18 is in the head area of the sleeve when the fitting is fully actuated although the spacing of the region 18 from the pin head 16 may be such that the region passes through and beyond the sleeve head 15 upon the completion of actuation of the fastener. It should be observed that the above described action of the flared region 18 insures the tight fitting and sealing engagement of the pin 11 in the tubular sleeve 10 and the tight engagement and sealing of the sleeve 10 in the opening 14 of the work.

The pin 11 is also constructed to effect actuation or expansion of the ring 12. A downwardly and inwardly tapered region or neck 19 is provided on the pin at the under side of the head 16. This neck 19 is cooperable with the ring 12 to expand the same when the pin 11 is actuated as will be later described. The pin 11 is further provided with two longitudinally spaced sets of annular serrations 20 and 21. The serrations 20 are spaced adjacent the flared region 18 and are engaged by the collar 13 to insure effective secure locking of the collar on the pin when the fastener is actuated. A relatively deep breakaway groove 22 is formed in the pin 11 adjacent the serrations 20 to facilitate failure or breaking of the pin at the completion of the fastener actuation or installation. The set of serrations 21 is spaced outwardly from the break groove 22 and is engageable by the jaws 23 of the actuating gun or installing tool 24. These serrations 21 may be of the type frequently employed in blind fasteners, and the like, and merely facilitate the pulling engagement of the tool 24 with the pin 11.

The collar 13 is a tubular member arranged around the pin 11 and engageable with the end of the sleeve head 15. The collar 13 may be a simple spool-like part provided at its lower end with a tapered annular face 25 engageable by the compressing member 26 of the installing tool 24. Fastener installing tools such as illustrated in Figure 1 are well known in the art and when the jaws 23 mesh with the serrations 21 the tool pulls outwardly or exerts tension on the pin 11 to pull the pin through the ring 12, the sleeve 10 and the collar 13 while the member 26 pushes or reacts against the face 25 of the collar 13 to hold the head 15 of the sleeve against the work W and to compress the collar so as to obtain interlocking or meshing engagement with the serrations 20. When the sleeve 10 is constructed of steel, or the like, to develop maximum fastener strength the collar 13 is preferably a separately manufactured part of aluminum or other material capable of some deformation so that it may be compressed or deformed to obtain effective retention or locking engagement with the serrations 20. However, when the sleeve is formed of aluminum or other material capable of some deformation the collar may be formed integral therewith. This is shown in Figure 5 of the drawings where the sleeve 10a has an outer or lower collar extension 13a adapted to be forced into locking or meshing engagement with the serrations 20 through the action of the installing tool 24 as just described. At the completion of the fastener installing operation the action of the installing tool 24 causes the pin 11 to break or snap off at the groove 22 so that the end of the pin remaining in the fastener is at or adjacent the outer end of the collar 13a.

The ring 12 is arranged on or around the pin 11 at the inner end of the sleeve 10 to be passed through the opening 14 to the blind side of the work W when the fastener is arranged in place and is expanded when the pin 11 is pulled outwardly to bear on and cooperate with the work whereby the work is gripped between the ring and the head 15 of the sleeve. In accordance with the invention the ring 12 is formed of steel or other hard flexible resilient material and the ring is longitudinally split so as to be expansible from its initial diameter where it closely engages around the pin to the operative condition where it bears against the inner surface of the work. As shown in Figure 3 the split 27 in the ring 12 is substantially tangential to the internal diameter of the ring. The lower or under surface of the ring 12 is flat to initially flatly bear on the end of the sleeve 10 and it is preferred to reduce the radial extent of this surface of the ring by providing an annular socket 28 in the ring. The upper end of the ring 12 is preferably sloped downwardly and outwardly to substantially conform with the under surface 17 of the pin head 16. When the pin 11 is pulled out from the position shown in Figure 1 the tapered region 18 of the pin moves into and through the ring 12 to slightly spread or expand the ring so that the ring may have partial engagement with the blind side of the work W. When the pin 11 approaches the end of its outward movement the tapered neck 19 acts on the ring 12 to further spread or expand the ring moving the annular lower end of the ring into full engagement with the blind side of the work W and by the time the pin 11 breaks off at the groove 22 the under face 17 of the head may press against the ring 12 to tightly clamp the ring against the work. In this connection it should be observed that the sloping underside 17 of the head 16 fits against and locks with the sloping upper surface of the ring 12. The ring expanding sloping neck 19 is of considerable length and the socket 28 in the ring 12 is adapted to receive the upper or blind end of the sleeve 10. These two features give the fastener an extensive range of work gripping ability allowing the fastener to be used on work whose aggregate thickness varies substantially. Expansion of the ring 12 and the clamping action just described causes or tends to cause the lower peripheral corner of the ring to bite or embed into the blind surface of the work W effecting a firm locking connection. In Figure 2, illustrating the fastener in its actuated condition, it will be seen that the work W is gripped or clamped between the head 15 of the sleeve 10 and the ring 12 with the pin 11 tightly fitting within the sleeve 10 and the sleeve in turn tightly expanded into and completely occupying the opening 14 thus constituting an attachment of high shear strength and a fluid tight attachment in which there is no looseness or play.

Figure 6 illustrates a form of the invention wherein the pin is screw actuated. In this construction the pin 11a is provided at its accessible end with a screw thread 30 and a nut 31 is screwed on this thread. The nut 31 which serves the same function as the collar 13 above described engages against the end of the sleeve 10 and when the nut is tightened down the pin 11a is pulled outwardly to produce expansion of the sleeve 10 thereby tightening the sleeve in the opening 14 and producing expansion of the ring 12 whereby the work W is securely gripped between the head 15 and the ring 12.

It is believed that the operation and features of this invention will be readily understood from the foregoing detailed description. In the embodiment of the invention illustrated in Figures 1 to 4 inclusive all of the tension assuming members and, in fact, all of the primary load assuming members of the fastener may be constructed of steel or other high strength material since it is not required to upset or deform any of these elements in installing the device. In other words, the pin 11, the sleeve 10 and the ring 12 may be constructed of materials of good physical properties and as above described the region of the pin 11 between the flared area 18 and the neck 19 is caused to tightly fit in the sleeve 10 and the sleeve in turn is caused to tightly bear in the opening 14 thus eliminating all lateral or radial play and assuring fluid tight engagement of the parts. The longitudinal actuation of the pin 11 in installing the fastener results in a firm gripping of the work W between the head 15 of the sleeve and the expanded ring 12. Where the collar 13 is employed it may be readily compressed sufficiently to obtain dependable gripping or interlocking engagement with the serrations 21 and where the nut 31 is used a strong dependable connection is assured. It will be noted the nut 31 may be formed of steel, or the like, since it requires no distortion for its locking of actuating action.

In the event it becomes desirable to remove the fastener of the invention it is only necessary to detach the collar 13 or the nut 31 from the pin and to move the pin inwardly to the extent that the spring ring 12 is free to spring back around the shank of the pin to the condition where it may be pulled out through the opening 14.

Having described only typical forms of the invention I do not wish to be limited to the specific details herein set forth, but wish to reserve to myself any variations or modifications that may appear to those skilled in the art and fall within the scope of the following claims.

I claim:

1. A shear and tension load carrying blind fastener for use in attaching together at least two members having aligned openings comprising a sleeve having an axially extending smooth bore therein for fitting the aligned openings of said members, a head on one end of the sleeve for engaging the outer surface of one member, a pin extending through the sleeve, a head on one end of the pin having a face in confrontation to the outer surface of the other member, the shaft of said pin having an axially extending sloping portion and a cylindrical region, the larger diameter end of said sloping portion being adjacent said pin head confronting face, a metal ring around the pin between the sloping portion of the pin shaft and the sleeve, one end of said ring engageable with the other end of said sleeve, said ring having a radial split to allow radial expansion and contraction by axial travel over the sloping portion of the pin shaft upon longitudinal movement of the pin relative to the sleeve, the outer diameter of the ring when contracted and the greatest diameter of said pin head being less than the diameter of the openings so as to pass therethrough and beyond the outer side of the other surface member, expansion of said ring effected by the engagement of said other end of said sleeve with said one ring end, said other end of said sleeve upon the engagement of said one ring end forcing said other ring end to ride up onto said sloping pin shaft portion as the pin is longitudinally moved relative to said sleeve whereby said one ring end expands radially to seat on said other member and said other ring end expands radially to seat on said pin head surface, said ring having a socket with an annular recess having a central axis coincident with the axis of said ring and having an internal diameter greater than the internal diameter of said ring, said socket forming on said ring a split annular shoulder, said shoulder being in width slightly less than one-half the different between the diameter of said pin adjacent said pin head confronting face and the internal diameter of said ring when contracted, an axially tapered region on said pin shaft located adjacent said one end of said sleeve when the pin is engaged, the larger end of said tapered region terminating at said cylindrical region of said pin shaft extending through said sleeve, said cylindrical region having a diameter slightly larger than the internal diameter of said sleeve, said tapered region and said cylindrical region operating to expand the sleeve into tight engagement with the walls of the openings as the pin is longitudinally moved therethrough for expansion of said sleeve and said ring and a collar secured to the pin in engagement with the sleeve head to hold said head in tension against the outer surface of the first mentioned member whereby the members are gripped between the ring and the sleeve head while shear loads are carried by the sleeve.

2. A blind fastener as in claim 1 in which said pin head confronting face is beveled downwardly.

References Cited in the file of this patent

UNITED STATES PATENTS

| | | |
|---|---|---|
| 494,745 | Phillips | Apr. 4, 1893 |
| 2,099,678 | Curtis | Nov. 23, 1937 |
| 2,248,755 | Hathorn | July 8, 1941 |
| 2,282,711 | Eklund | May 12, 1942 |
| 2,298,203 | Eklund | Oct. 6, 1942 |
| 2,385,886 | Shaff | Oct. 2, 1945 |
| 2,469,349 | Zeidler | May 3, 1949 |
| 2,527,307 | Huck | Oct. 24, 1950 |
| 2,691,915 | Cherry | Oct. 19, 1954 |
| 2,697,375 | Brisback | Dec. 21, 1954 |

FOREIGN PATENTS

| | | |
|---|---|---|
| 292,035 | Great Britain | June 14, 1928 |
| 428,653 | Italy | Dec. 29, 1947 |